US007826239B2

(12) United States Patent
Tepsumran et al.

(10) Patent No.: US 7,826,239 B2
(45) Date of Patent: Nov. 2, 2010

(54) OVERLOAD PROTECTION DELAY CIRCUIT FOR SWITCHING POWER SUPPLY

(75) Inventors: Chalermkiat Tepsumran, Amphur Muang (TH); Allwyn Jacob D. Cunha, Amphur Muang (TH); Apinun Pomta, Amphur Muang (TH)

(73) Assignee: Delta Electronics (Thailand) Public Company, Limited, Samutprakarn (TH)

( * ) Notice: Subject to any disclaimer, the term of this patent is extended or adjusted under 35 U.S.C. 154(b) by 599 days.

(21) Appl. No.: 11/694,342

(22) Filed: Mar. 30, 2007

(65) Prior Publication Data

US 2008/0239607 A1 Oct. 2, 2008

(51) Int. Cl.
*H02H 7/122* (2006.01)

(52) U.S. Cl. .................. 363/56.09; 363/21.15; 323/902

(58) Field of Classification Search .............. 363/56.09, 363/21.15, 50, 56.1, 56.11, 21.07; 323/902, 323/231, 286; 327/326
See application file for complete search history.

(56) References Cited

U.S. PATENT DOCUMENTS 6,483,725 B2 * 11/2002 Schetters et al. .............. 363/19
7,551,464 B2 * 6/2009 Chen ........................... 363/97

* cited by examiner

*Primary Examiner*—Harry Behm

(57) ABSTRACT

Disclosed is an overload protection delay circuit for use in a switching power supply for enabling the switching power supply to detect overload problems with high accuracy. The overload protection delay circuit is connected between a photo coupler and a pulse-width modulator of the switching power supply, and is consisted of an energy storage device such as a capacitor and a charging controller such as a zener diode. The charging controller is configured to set a limit value for allowing the energy storage device to be charged by an internal current source of the pulse-width modulator when the feedback signal of the switching power supply reaches the limit value. By charging the energy storage device, a time delay is added to the feedback signal so that the pulse-width modulator can accurately activate the internal overload protection mechanism without the interference of load transients.

10 Claims, 2 Drawing Sheets

200
Vin
110
111
112
113
121
Load
Vo
116
FB
PWM
119
210
115
122
$V_{FB}$
114
C10
+
$V_z$
ZD3
-

OVERLOAD PROTECTION DELAY CIRCUIT FOR SWITCHING POWER SUPPLY

FIELD OF THE INVENTION

The present invention is related to a switching power supply, and more particularly to a switching power supply with overload protection function, in which the switching power supply includes an overload protection delay circuit for enabling the switching power supply to detect overload problems with high accuracy.

BACKGROUND OF THE INVENTION

FIG. 1 shows the circuit diagram of a typical switching power supply according to the prior art. As shown in FIG. 1, a switching power supply 100 includes a bridge rectifier 110, a transformer 111, a secondary rectifier 112, an output filter 113, a feedback control unit 114, a photo coupler 115, a pulse-width modulator (PWM) 116, and a switching device 119. The bridge rectifier 110 is configured to rectify an input AC voltage Vin into a full-wave rectified DC voltage which is then provided to the primary winding of the transformer 111. The switching device 119 is usually implemented by a MOSFET device and the switching device 119 is connected in series with the primary winding of the transformer 111. When the switching device 119 is turned on, the primary winding of the transformer 111 receives an input current from an output terminal of the bridge rectifier 110, thereby storing energy therein. When the switching device 119 is turned off, the energy stored in the primary winding of the transformer 111 is transferred to the secondary side of the transformer 111, thereby inducing an AC voltage across the secondary winding of the transformer 111. The AC voltage induced across the secondary winding of the transformer 111 is rectified by the secondary rectifier 112 which is typically implemented by a diode rectifier into a desirable DC voltage. The DC voltage outputted from the secondary rectifier 112 is smoothed by the output filter 113 which is implemented by a filtering capacitor into an output DC voltage Vo. The output DC voltage Vo is provided to power a load 121. The feedback control unit 114 is connected to a positive terminal of the output voltage Vo and includes a voltage divider made up of at least two resistive elements. The feedback control unit 114 is configured to generate a feedback signal $V_{FB}$ indicative of the output voltage Vo. The feedback signal $V_{FB}$ is transmitted to a feedback signal input terminal FB of the pulse-width modulator 116 through the photo coupler 115 having a photo-transistor 122, and thereby allowing the pulse-width modulator 116 to maintain the output voltage Vo at a predetermined level. In particular, the pulse-width modulator 116 is configured to generate pulse signals to drive the switching device 119 to turn on and off according to a specified duty ratio.

In normal operation, the load 121 is configured to draw current from the output terminal of the switching power supply 100 to sustain its operation. In most cases, the output voltage Vo of the switching power supply 100 is always constant, and the output power of the switching power supply 100 is determined by the current drawn to the load 121. When the load 121 demands an output power greater than the switching power supply 100 can provide, the switching power supply 100 will enter into an overload state. When the switching power supply 100 enters into an overload state due to the overload of the load 121, the output voltage Vo will decrease and a large current will flow in the switching power supply 100. This would damage the circuit elements of the switching power supply 100, including the switching device 119, the secondary rectifier 112 and the load 121 due to the overheating effect.

In order to overcome the overload or load short problems, conventional pulse-width modulators have incorporated an over-load protection mechanism to protect the switching power supply from damage due to overload problems. The overload protection mechanism built in a conventional pulse-width modulator is typically configured to monitor the feedback signal inputted through the feedback signal input pin and compare the feedback signal with a specified threshold value. If the feedback signal exceeds the threshold value, an overload condition is assumed to occur. Under this condition, a switching stop signal is issued to stop the operation of the pulse-width modulator, and thereby shutting down the switching power supply.

However, a problem with this type of overload protection mechanism is that it can be triggered on load transients. When load transients occur, the output voltage of the switching power supply will undergo fluctuation and the feedback signal will have momentary rises. Thus, even if the power required by the load does not exceed the maximum output power of which the switching power supply can provide, the feedback signal would abruptly exceed the threshold value and falsely activate the internal overload protection mechanism of the pulse-width modulator. Hence, it is desirable to add a time delay between the rise of the feedback signal and the activation of the overload protection mechanism so that the brief rises of the feedback signal due to the load transients can be neglected by the pulse-width modulator.

Therefore, it is intended to develop an overload protection delay circuit for adding a time delay to the feedback signal of a switching power supply so as to enable the internal pulse-width modulator of the switching power supply to accurately detect the occurrence of overload problems.

SUMMARY OF THE INVENTION

An object of the present invention is to provide an overload protection delay circuit for allowing an internal pulse-width modulator of a switching power supply to accurately protect the switching power supply from damage due to overload problems.

According to the present invention, an overload protection delay circuit is provided for adding a time delay to a feedback signal of a switching power supply when the feedback signal of the switching power supply reaches a limit value being smaller than a threshold value set to activate an overload protection mechanism of the switching power supply, wherein the switching power supply includes a switching controller and a photo coupler for coupling the feedback signal to the switching controller. In a primary aspect of the present invention, the overload protection delay circuit is made up of an energy storage device connected to the switching controller and the photo coupler, and a charging controller connected between the capacitor and ground and configured to set a limit value for allowing the energy storage device to be charged so as to enable the energy storage device to generate the time delay.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
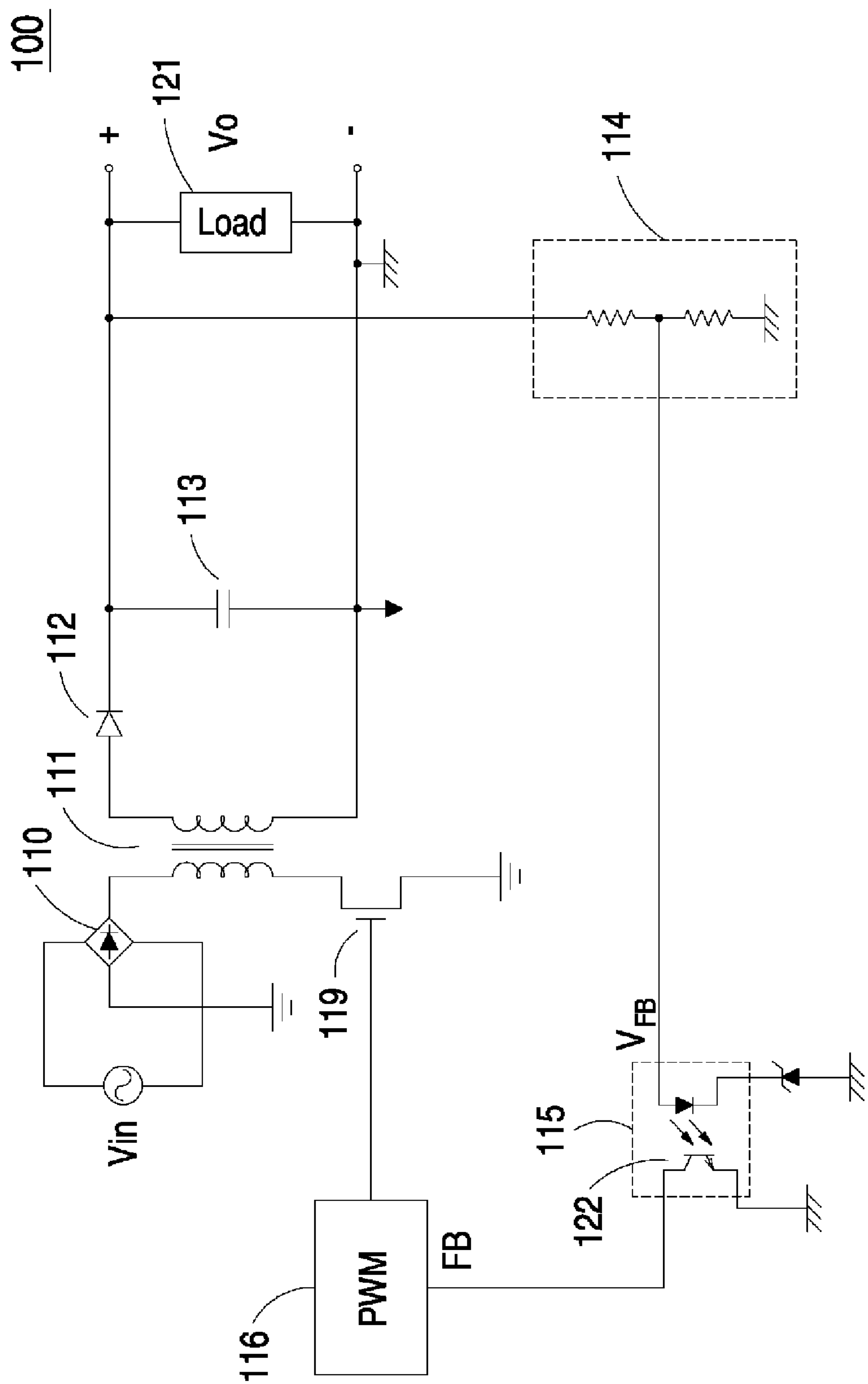
FIG. 1 is a circuit diagram showing the circuit architecture of the switching power supply according to the prior art.
Figure 2:
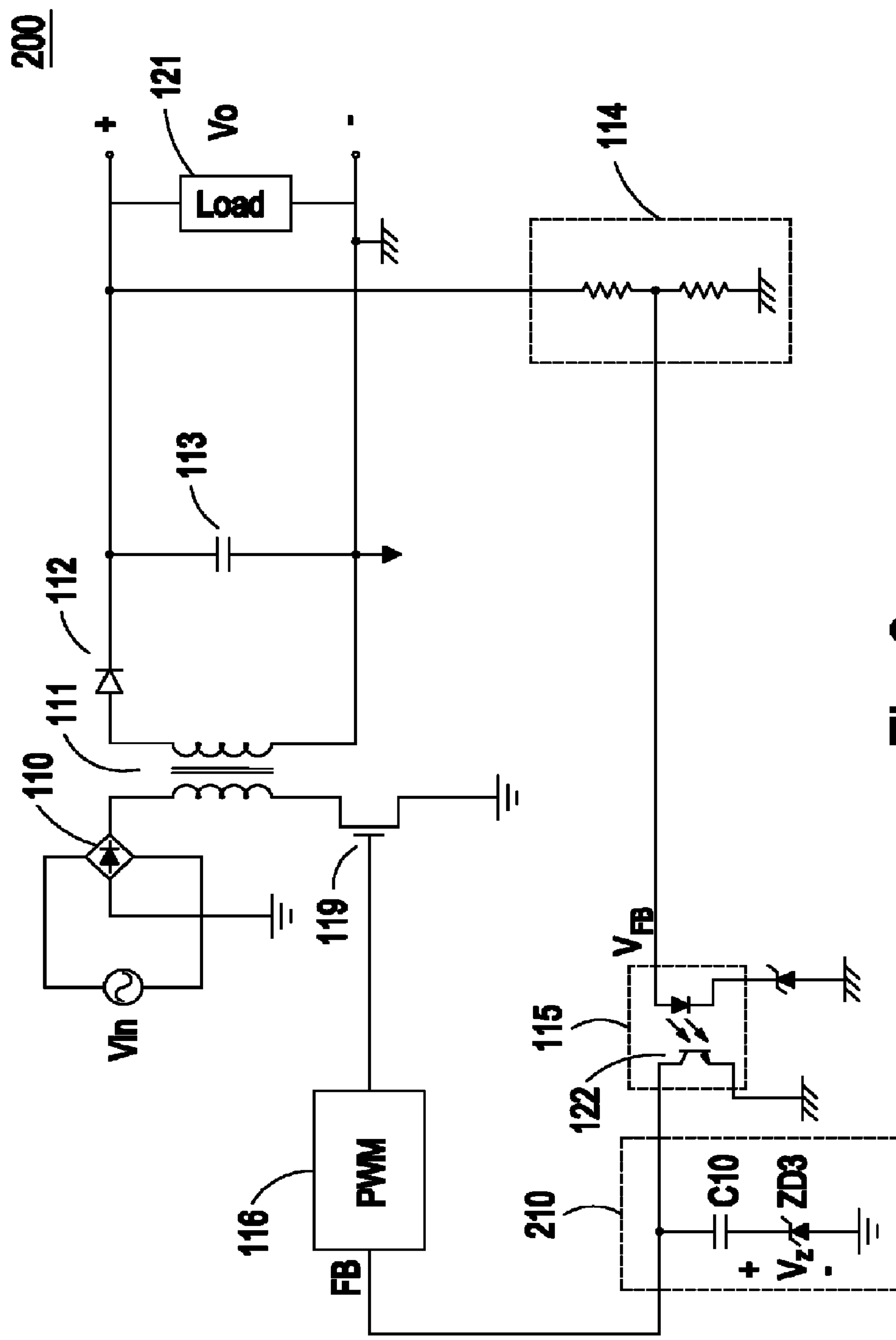
FIG. 2 is a circuit diagram showing the circuit architecture of the switching power supply according to the present invention.

A circuit diagram of the switching power supply according to the present invention is illustrated in FIG. 2. In FIG. 2, a switching power supply 200 includes a bridge rectifier 110, a transformer 111, a secondary rectifier 112, an output filter 113, a feedback control unit 114, a photo coupler 115, a switching device 119, and a pulse-width modulator 116. It is to be particularly noted that the same circuit element is denoted by the same reference numeral through the present invention. Hence, the bridge rectifier 110, the transformer 111, the secondary rectifier 112, the output filter 113, the feedback control unit 114, the photo coupler 115, the switching device 119, and the pulse-width modulator 116 all have the same circuit configuration and operation theorem with their counterparts of FIG. 1. Therefore, it is not intended to give details about these circuit elements herein.

In FIG. 2, the switching power supply 200 further includes an overload protection delay circuit 210. The overload protection delay circuit 210 is connected between the photo coupler 115 and the pulse-width modulator 116, and is made up of a charging controller, for example, a zener diode ZD3, and an energy storage device, for example, a capacitor C10. The capacitor C10 is connected between a feedback signal input terminal FB of the pulse-width modulator 116 and the anode of the zener diode ZD3, and the zener diode ZD3 is connected between one end of the capacitor C10 and ground. The zener diode ZD3 is configured to set a limit value $V_z$ for allowing the capacitor C10 to be charged. It should be noted that the capacitor C10 has a relatively large capacitance. Next, the operation of the overload protection delay circuit 210 according to the present invention will be discussed in detail as follows.

In normal load or peak load conditions, the output voltage Vo of the switching power supply 200 is fixed at a predetermined level, and the threshold value of the zener diode ZD3 is set to be a predetermined level, for example, 3 volts. In overload conditions, the power required by the load 121 has exceeded the maximum output power of the switching power supply 200. Under this condition, the output voltage Vo decreases and the load current increases up to the maximum allowable current of the switching power supply 200. At this time, the current of the photo transistor 122 within the photo coupler 115 will decrease to zero, and the collector-emitter voltage of the photo transistor 122 within the photo coupler 115 will increase. As a result, the feedback signal $V_{FB}$ will increase. When the feedback signal $V_{FB}$ increases to the level identical to limit value of the zener diode, for example, the threshold value of the zener diode ZD3 which is 3 volts, the zener diode ZD3 is conducting current and thus the capacitor C10 is charged by an internal current source within the pulse-width modulator 116 (not shown). Because the current of the photo transistor 122 within the photo coupler 115 is zero, the feedback signal $V_{FB}$ continues to increase. Before the feedback signal $V_{FB}$ reaches the threshold value set by the pulse-width modulator 116 for activating the overload protection mechanism, the pulse-width modulator 116 will not shut down until the feedback signal reaches the threshold value set by the pulse-width modulator for activating the overload protection mechanism. Thus, the capacitor C10 provides a time delay that can be easily determined as the time required to increase the feedback signal $V_{FB}$ from the limit value $V_z$ set by the zener diode ZD3 to the threshold value set by the pulse-width modulator 116. However, it should be noted that the amount of the time delay added to the feedback signal $V_{FB}$ depends on the capacitance of the capacitor C10. Increasing the capacitance of the capacitor C10 can obtain a longer delay time for the feedback signal. Therefore, the choice of the capacitance of the capacitor C10 would be an important factor in determining the response time of the switching power supply 200.

In conclusion, the present invention proposes an overload protection delay circuit connected between the photo coupler and the pulse-width modulator of a switching power supply. The overload protection delay circuit includes a charging controller and an energy storage device, wherein the charging controller is configured to set a limit value for allowing the energy storage device to generate a time delay which is to be added to the feedback signal when the feedback signal reaches the limit value of the charging controller. Thus, the overload protection delay circuit according to the present invention can achieve a simple and efficient circuitry to add a proper time delay to the feedback signal of the switching power supply between the time point that the feedback signal reaches the limit value of the charging controller and the time point that the feedback signal reaches the threshold value set to activate the overload protection mechanism, so that switching power supply can accurately perform the overload protection function without the interference of load transients.

Those of skilled in the art will recognize that these and other modifications can be made within the spirit and scope of the present invention as further defined in the appended claims.

What is claimed is:

1. An overload protection delay circuit for adding a time delay to a feedback signal of a switching power supply when the feedback signal of the switching power supply reaches a limit value, wherein the switching power supply includes a switching controller and a coupling device for coupling the feedback signal to the switching controller, the overload protection delay circuit comprising:

an energy storage device connected to the switching controller and the coupling device; and a charging controller connected between the energy storage device and ground and configured to set the limit value for allowing the energy storage device to be charged so as to enable the energy storage device to generate the time delay, wherein the charging controller is a zener diode.

2. The overload protection delay circuit according to claim 1 wherein the energy storage device is a capacitor having a relatively large capacitance.

3. The overload protection delay circuit according to claim 1 wherein the coupling device is a photo coupler having a photo transistor therein.

4. The overload protection delay circuit according to claim 1 wherein the coupling device is connected to a feedback signal input terminal of the switching controller.

5. The overload protection delay circuit according to claim 1 wherein the switching controller is a pulse-width modulator.

6. A switching power supply comprising:

a transformer;

a switching device connected to a primary winding of the transformer;

a switching controller connected to the switching device for controlling switching operations of the switching device;

a feedback control unit connected to an output terminal of the switching power supply for evaluating a feedback signal indicative of an output voltage of the switching power supply;

a coupling device connected between the feedback control unit and the switching controller for coupling the feedback signal to the switching controller; and an overload protection delay circuit connected between the coupling device and the switching controller for adding a time delay to the feedback signal when the feedback signal reaches a limit value, wherein the overload protection delay circuit comprises:

an energy storage device connected to the switching controller and the coupling device; and a charging controller connected between the energy storage device and ground and configured to set the limit value for allowing the energy storage device to be charged so as to enable the energy storage device to generate the time delay, wherein the charging controller is a zener diode.

7. The switching power supply according to claim 6 wherein the coupling device is a photo coupler having a photo transistor.

8. The switching power supply according to claim 6 wherein the energy storage device is a capacitor having a relatively large capacitance.

9. The switching power supply according to claim 6 wherein the coupling device is connected to a feedback signal input terminal of the switching controller.

10. The switching power supply according to claim 6 wherein the switching controller is a pulse-width modulator.

* * * * *